(12) United States Patent
Courtier et al.

(10) Patent No.: US 11,499,432 B2
(45) Date of Patent: Nov. 15, 2022

(54) METHOD FOR ALTERING THE LAW OF TWIST OF THE AERODYNAMIC SURFACE OF A GAS TURBINE ENGINE FAN BLADE

(71) Applicant: SAFRAN AIRCRAFT ENGINES, Paris (FR)

(72) Inventors: Vivien Mickaël Courtier, Moissy-Cramayel (FR); Adrien Louis Nicolas Laurenceau, Moissy-Cramayel (FR); Dominique Gerhadt Mayhew, Moissy-Cramayel (FR); Jonathan Evert Vlastuin, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 75 days.

(21) Appl. No.: 15/741,374

(22) PCT Filed: Jul. 1, 2016

(86) PCT No.: PCT/FR2016/051675
§ 371 (c)(1),
(2) Date: Jan. 2, 2018

(87) PCT Pub. No.: WO2017/006033
PCT Pub. Date: Jan. 12, 2017

(65) Prior Publication Data
US 2019/0003313 A1    Jan. 3, 2019

(30) Foreign Application Priority Data
Jul. 3, 2015  (FR) .................................. 1556286

(51) Int. Cl.
*F01D 5/16* (2006.01)
*F01D 5/14* (2006.01)
*B64D 27/00* (2006.01)

(52) U.S. Cl.
CPC ............... *F01D 5/16* (2013.01); *F01D 5/141* (2013.01); *B64D 2027/005* (2013.01);
(Continued)

(58) Field of Classification Search
CPC ... F01D 5/12; F01D 5/14; F01D 5/141; F01D 5/16; F05D 2260/96; Y02T 50/673; Y10T 29/49336; B23P 15/02; B23P 15/04
See application file for complete search history.

(56) References Cited

U.S. PATENT DOCUMENTS

2002/0064458 A1* 5/2002 Montgomery ........ F04D 29/666
                                                              415/208.3
2002/0074102 A1* 6/2002 Wang ................... B22D 27/045
                                                              164/122.2

(Continued)

FOREIGN PATENT DOCUMENTS

EP              0 801 230 A2   10/1997
WO    WO-2013178914 A1 * 12/2013 ............. F01D 5/141
WO         2014/087109 A1    6/2014

OTHER PUBLICATIONS

International Search Report dated Oct. 21, 2016 in PCT/FR2016/051675 filed Jul. 1, 2016.

*Primary Examiner* — Eldon T Brockman
*Assistant Examiner* — Elton K Wong
(74) *Attorney, Agent, or Firm* — Oblon, McClelland, Maier & Neustadt, L.L.P.

(57) ABSTRACT

A method of altering the twisting relationship for the aerodynamic surface of a fan blade of a gas turbine engine, wherein the following steps are performed: establishing, for a portion of the aerodynamic surface of the fan blade, an alteration relationship defined by variation of a pitch angle of the blade as a function of radial height along the blade, the alteration relationship including alterations that are each defined by a height along with the radial height of the fan (Continued)

blade and by an amplitude; and applying the alteration relationship as established in this way to an initial twisting relationship of the fan blade so as to obtain an altered twisting relationship for the fan blade, the initial twisting relationship being defined by a polynomial for the radial height of the fan blade as a function of its pitch angle.

6 Claims, 4 Drawing Sheets

(52) U.S. Cl.
 CPC ...... *F05D 2220/36* (2013.01); *F05D 2260/96* (2013.01); *Y02T 50/60* (2013.01)

(56) References Cited

U.S. PATENT DOCUMENTS

| | | | |
|---|---|---|---|
| 2005/0096891 A1* | 5/2005 | Simpson | F01D 5/141 703/7 |
| 2015/0044052 A1* | 2/2015 | Worth | F04D 29/324 416/212 R |
| 2015/0152880 A1* | 6/2015 | Reiss | F04D 29/388 416/229 A |
| 2015/0315915 A1 | 11/2015 | Vlastuin et al. | |
| 2016/0138402 A1* | 5/2016 | Lentz | F01D 5/16 29/889.7 |

* cited by examiner

METHOD FOR ALTERING THE LAW OF TWIST OF THE AERODYNAMIC SURFACE OF A GAS TURBINE ENGINE FAN BLADE

BACKGROUND OF THE INVENTION

The present invention relates to the general field of the mechanical design of a gas turbine engine fan blade, and more particularly to a blade of an unducted fan in an aviation turbine engine having two contrarotating propellers.

In the mechanical design of a fan blade, it is known to take account of the dynamic dimensioning (or frequency placement) of the blade, in particular so as to limit any risk of damage of vibratory origin associated with synchronous phenomena that may be aerodynamic (such as wake effects) or mechanical (such as unbalances).

The dynamic dimensioning of a fan blade is typically performed by constructing its Campbell diagram, i.e. by placing curves that plot variation in the frequency of a resonant mode of the blade (associated with the same modal deformation) as a function of the speed of rotation of the rotor. The curve showing the frequency with which the rotor is excited is then superposed on its harmonics in order to form the Campbell diagram. Furthermore, when the blade is a fan blade of a turbine engine having two contrarotating propellers, the Campbell diagram of the blade also includes the curve for the excitation frequency of the unbalance of one propeller as seen from the other propeller, together with the associated harmonics. On the basis constructing such a Campbell diagram, it is considered that the dynamic dimensioning of the blade is valid when a certain number of frequency margins are satisfied in the desired range of speeds.

More precisely, the resonant modes of a fan blade of a turbine engine having two contrarotating propellers give, in order of increasing frequency: the first bending mode of the blade (referred to as mode 1F), the first twisting mode (referred to as mode 1T), and then other modes. The first step of the dynamic dimensions of such a blade then consists in placing the mode 1F correctly (this choice determines the shape of the blade to a great extent, in particular in terms of its thickness relationship). Once the mode 1F has been placed, positioning the mode 1T is found to be a choice that is particularly difficult to make. Specifically, the mode 1T is a mode that is relatively flat, i.e. its frequency depends only very little on the speed of rotation of the rotor. Given the very broad range of the speeds of rotation of a turbine engine having two contrarotating propellers, the mode 1T presents very many crossings in the Campbell diagram.

FIG. 1 shows an example of the dynamic dimensioning of a blade for a turbine engine having two contrarotating propellers. The Campbell diagram shown in the figure thus reveals the frequency of a resonant mode of the blade together with its harmonics (1N, 2N, 3N, etc.) as a function of the speed of rotation of the rotor. The diagram also shows the first bending mode (mode 1F) and the first twisting mode (mode 1T) of the blade. It can be seen in this figure that the mode 1T presents numerous crossings with the various resonant modes of the blade.

When positioning the mode 1T of the blade, it is found to be necessary to ensure dynamic margins that are sufficient, i.e. frequency distances from the harmonics of the blade that are large enough for the various stabilized operating points of the engine. By way of example, FIG. 1 shows various stabilized operating points of the engine (vertical lines P1 and P2) for which it is necessary that the mode 1T complies with minimum frequency distances from the nearest harmonics of the blade (these frequency distances from the nearest harmonics are represented in FIG. 1 by the distances d1 for the stabilized operating point P1, and d2 for the stabilized operating point P2).

Nevertheless, it is not easy to modify the frequency position of the mode 1T of the blade significantly without modifying the position of the mode 1F. In particular, geometrical modifications to the thickness or to the chord of the blade lead to a modification in the placing of the mode 1F, thereby requiring new design work for the blade. Furthermore, if the thickness of the blade is increased, the resulting increase in weight becomes significant.

OBJECT AND SUMMARY OF THE INVENTION

A main object of the present invention is thus to mitigate such drawbacks by proposing a method of altering the twisting relationship of the aerodynamic surface of a fan blade that makes it possible to raise the frequency of the mode 1T of the blade without needing to modify the frequency of the mode 1F.

In accordance with the invention, this object is achieved by a method of altering the twisting relationship for the aerodynamic surface of a fan blade of a gas turbine engine, wherein the following steps are performed:

establishing, for a portion of the aerodynamic surface of the fan blade, an alteration relationship defined by variation of a pitch angle of the blade as a function of radial height along the blade, said alteration relationship comprising alterations that are each defined by a height along with the radial height of the fan blade and by an amplitude; and applying the alteration relationship as established in this way to an initial twisting relationship of the blade so as to obtain an altered twisting relationship for the fan blade, said initial twisting relationship being defined by a polynomial for the radial height of the fan blade as a function of its pitch angle.

The twisting relationship of the aerodynamic surface of a fan blade is defined by the pitch angle made by the chord of each blade section (i.e. the straight line segment connecting the leading edge to the trailing edge of the blade section) relative to the axis of rotation of the blade as a function of the height of said blade section. This twisting relationship is a determining factor in the aerodynamic performance of the blade, which is defined at the beginning of designing the blade by aerodynamic engineers. However, the inventors have observed that introducing alterations to the twisting relationship makes it possible to have an influence on the twisting stiffness of the blade. Thus, by introducing alterations into the twisting relationship, it is possible to modify (and in particular to increase) the frequency of the mode 1T of the blade without needing to modify the frequency of the mode 1F. Thus, by way of example, the modifications to the twisting relationship provided by the invention have made it possible to raise the mode 1T of a fan blade of a turbine engine having two contrarotating propellers by up to about 40% without having to modify the mode 1F, with this applying for all stabilised operating points of the engine.

Preferably, the alteration relationship is defined in such a manner as to be zero and to have a derivative of zero at least one end of the portion of the aerodynamic surface of the fan blade (depending on the topology of the modified portion). This characteristic makes it possible to ensure perfect continuity of the aerodynamic surface between the portion subjected to alteration and the remainder of the blade.

Also preferably, the alteration relationship is also defined in such a manner that the amplitude of each alteration is of absolute value that is less than or equal to 5°. Limiting the amplitude of the alterations to 5° (in absolute value) makes it possible to avoid excessively modifying the aerodynamic profile of the blade.

Also preferably, the alteration relationship is also defined in such a manner as to present a maximum slope of the order of 0.05 degrees per millimeter (°/mm). Limiting the slope of the alteration relationship also makes it possible to avoid any sudden change in the aerodynamic profile of the blade.

The alteration relationship may be a function for which the number of alterations corresponds to the number of local minimums and maximums of said function. It may comprise at least two alterations in opposite directions.

The step of applying the alteration relationship to the initial twisting relationship of the fan blade may consist in adding the alteration relationship to the initial twisting relationship.

Preferably, the predetermined portion of the fan blade over which the alteration relationship is applied extends from the root of the blade to a height corresponding to substantially 30% of the total radial height of the blade. Such a height for the blade portion subjected to the alteration makes it possible to raise the mode 1T of the blade while maintaining the aerodynamic performance of the blade.

The invention also provides an application of the above-defined method to modifying the frequency placement of the first twisting mode of a fan blade of a gas turbine engine.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

The invention relates to the dynamic dimensioning of any gas turbine engine fan blade, and in particular of a fan blade for an aviation turbine engine having two contrarotating propellers.

The dynamic dimensioning (or frequency placement) of a fan blade seeks to limit the risks of damage of vibratory origin associated with synchronous phenomena that may be aerodynamic or mechanical. It consists in particular in positioning the mode 1T (or first twisting mode) of the blade in its Campbell diagram while complying with minimum frequency distances from the harmonics closest to the blade for various stabilized operating points of the engine (e.g. corresponding to an approach stage or a takeoff stage of the airplane).

For this purpose, the invention makes provision for altering the twisting relationships of the aerodynamic surface of a portion of the fan blade. This twisting relationship is a relationship that is established when designing the fan blade. Generally it is very simple in shape: for example, it may be in the form of a polynomial relationship of first or second order (i.e. it may have the shape of a straight line or of a parabola).

Figure 1:
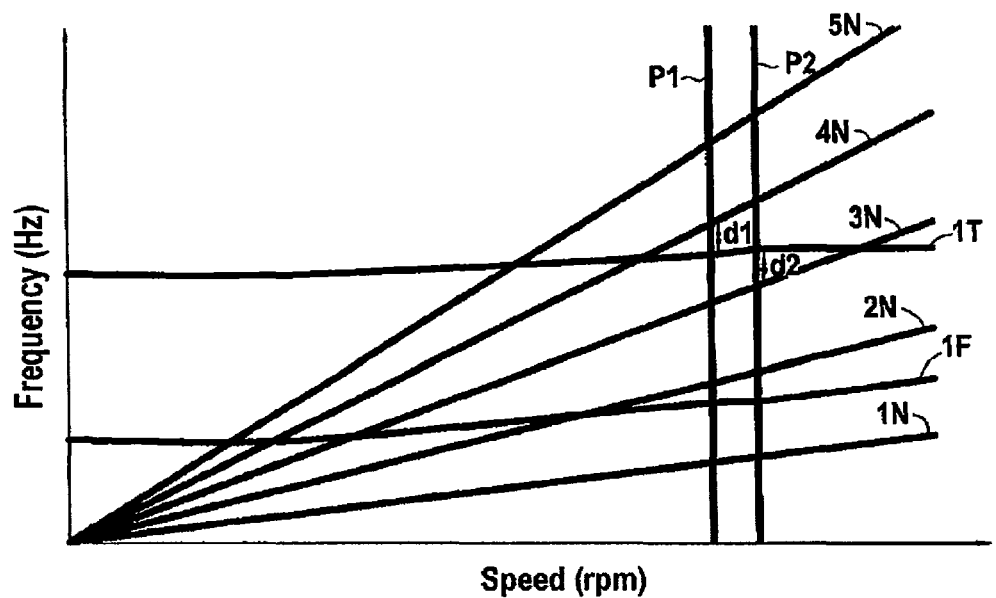
FIG. 1, described above, represents an example Campbell diagram drawn up for a blade of a turbine engine having two contrarotating propellers.
Figure 2:
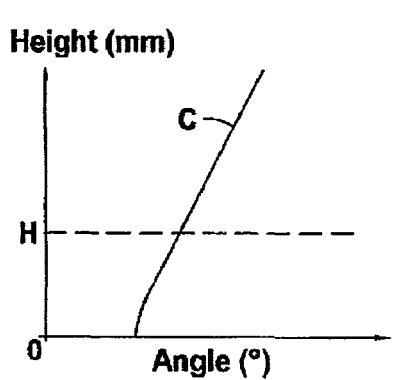
FIGS. 2 to 4 show examples of different steps in the alteration method of the invention.

Curve C shown in FIG. 2 illustrates an example of such a twisting relationship (referred to below as the "initial" twisting relationship). This curve C thus gives the pitch angle (in degrees) between the chord of each section of the blade relative to the axis of rotation of the blade as a function of the height (in mm) of said blade section.

Once the initial twisting relationship is established, the method of the invention makes provision for determining the portion of the aerodynamic surface of the fan blade that is to be altered. Typically, a predetermined portion of the fan blade is selected that lies between a root of the blade (height 0 in FIGS. 2 and 3) to a height that corresponds to substantially 30% of the total radial height of the blade (height H in FIGS. 2 and 3). By experience, it has been found that giving this height to the portion that is to be altered enables the mode 1T of the blade to be raised, while conserving the aerodynamic performance of the blade.

The following step of the method of the invention consists in proceeding with a certain number of alterations to the initial twisting relationship of the blade over the predetermined portion [0-H] of the aerodynamic surface. The term "alteration" is used herein to designate any variation in the pitch angle of the blade relative to the previously-established twisting relationship.

For this purpose, the method makes provision to establish an alteration relationship over the predetermined portion of the blade, this alteration relationship comprising alterations, each of which is defined by a height along the radial height of the fan blade and by an amplitude.

The alteration relationship may be formalized on the basis of at least one of the following two criteria. The first criterion establishes that the alteration relationship is preferably defined in such a manner as to be zero and to have a derivative of zero at least at one end of the aerodynamic surface portion of the fan blade (typically at the level of the height H in FIG. 3), so as to ensure perfect aerodynamic continuity among the various aerodynamic surfaces of the blade.

The other criterion that is taken into account in order to formalize the alteration relationship is defined by the number of alterations, with each alteration having a height along the radial height of the blade and an amplitude of the alteration. The definition of these criteria for formalizing the alteration relationship makes it possible to perform discretization correctly, thus making it easier to add to the initial twisting relationship of the blade so as to obtain the altered twisting relationship during the following step of the method.

It should be observed that the number of alterations and the parameters of each alteration (i.e. its height and amplitude) are selected so as to comply with minimum frequency distances between the mode 1T and the harmonics nearest to that mode for various different stabilized operating points of the engine (these frequency distances may be equal to 5 hertz (Hz) for example). To this end, it is possible to set up an optimization loop consisting in reconstructing the geometry of the blade from the altered twisting relationship, this geometry being subjected to various static and dynamic calculations and to frequency processing that are known to the person skilled in the art.

Figure 3:
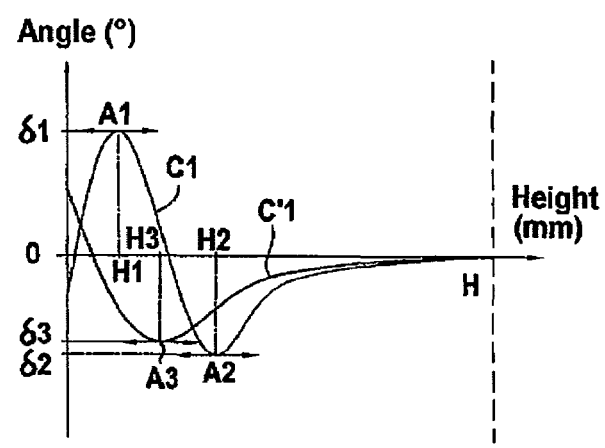

FIG. 3 is a diagram showing two examples of alteration relationship that can be applied to the initial twisting relationship shown in FIG. 2.

Thus, the curve C1 in FIG. 3 shows an example of an alteration relationship defined over the range [0-H] of the blade and that comprises two alterations represented by points A1 and A2, each of which is defined by a respective height H1 or H2 and by a respective amplitude δ1 or δ2. It should be observed that these alterations are in opposite directions (i.e. one of them is of positive amplitude and the other is of negative amplitude).

Likewise, the curve C'1 is a curve showing another example of an alteration relationship likewise defined over the range [0-H] of the blade, and that has a single alteration represented by the point A3. This alteration A3 is defined by a height H3 and by an amplitude δ3.

Once the alteration relationship has been formalized, it may be added to the initial twisting relationship of the fan blade, e.g. by simple addition.

Figure 4:
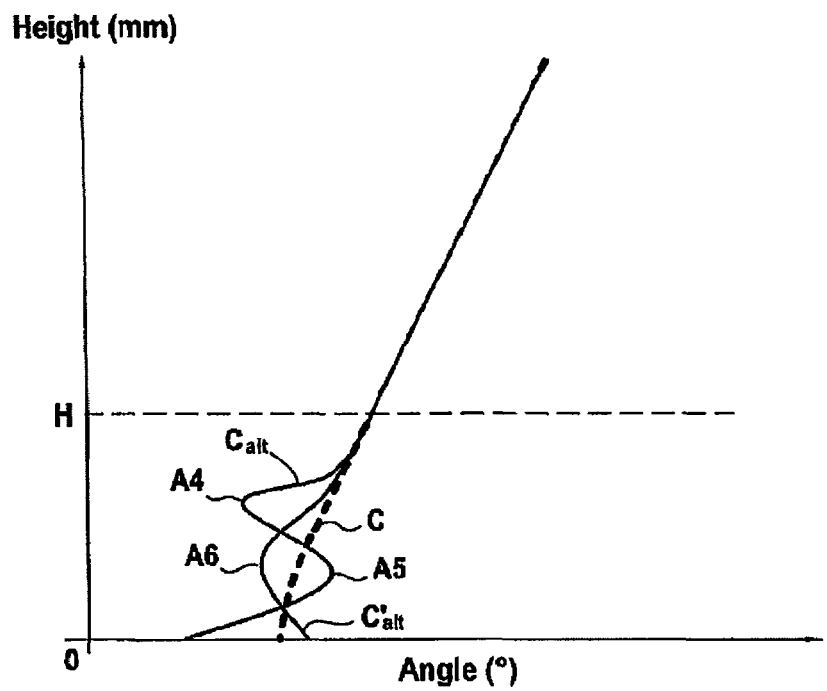

FIG. 4 shows the result of adding the alteration relationship shown diagrammatically in FIG. 3 to the initial twisting relationship C shown in FIG. 2.

Thus, in FIG. 4, the curve $C_{alt}$ is a curve showing the result of applying the alteration relationship C1 to the initial twisting relationship C, while the curve $C'_{alt}$ shows the result of applying the alteration relationship C'1 to the same initial twisting relationship C.

Adding these alteration relationships changes the profile of the twisting relationship C in the sense that the altered twisting relationship $C_{alt}$ now has two extremums (represented by points A4 and A5 and corresponding to the two alterations of the alteration relationship C1), while the altered twisting relationship $C'_{alt}$ has one extremum (represented by the point A6 and corresponding to the single alteration of the alteration relationship C'1).

By way of illustrative and non-limiting example, the alteration relationship may be in the form of a mathematical function defined over the height range 0 to H, of class $C^1$, being zero at H and of zero derivative at H. As for the number of alterations, that corresponds to the number of roots of the derivative of such a mathematical function, and the amplitudes of these alterations is equal to the values of the function in the roots of its derivative.

Preferably, other criteria may be taken into account when formalizing the alteration relationship. Thus, it is preferable for the amplitude of each alteration to have an absolute value that is less than or equal to 5°. Furthermore, it is also preferable for the alteration relationship to be defined in such a manner that it presents a maximum slope of about 0.05°/mm. These two additional criteria seek to avoid changing the aerodynamic profile of the blade too strongly.

Figure 5:
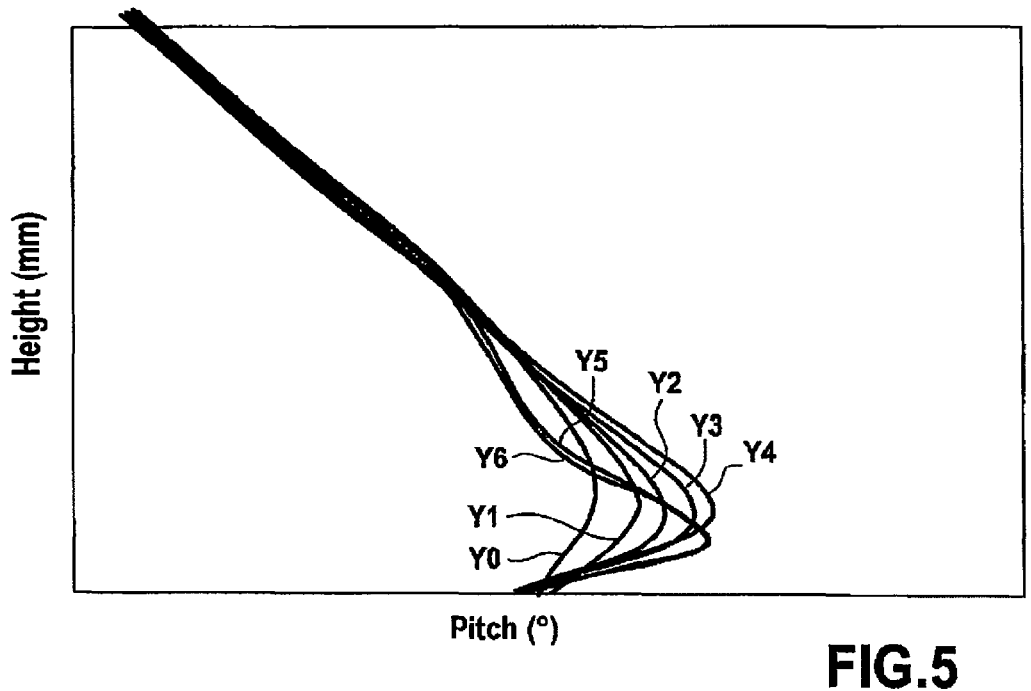
FIGS. 5 to 8 show an implementation of the alteration method of the invention as applied to a fan blade, with the impact of the method on the resonant frequencies of the modes 1F and 1T on the twist-bend coupling and on the de-twisting of the blade.

FIG. 5 shows an example of implementing the alteration method of the invention as applied to a fan blade for a turbine engine having two contrarotating propellers.

More precisely, this figure shows parts of various twisting relationships for a fan blade in such a turbine engine that are altered by the method of the invention. These altered twisting relationships are represented by curves Y1 to Y6, while the curve Y0 represents the initial twisting relationship of the blade (i.e. the twisting relationship of the blade prior to alteration).

Figure 6:
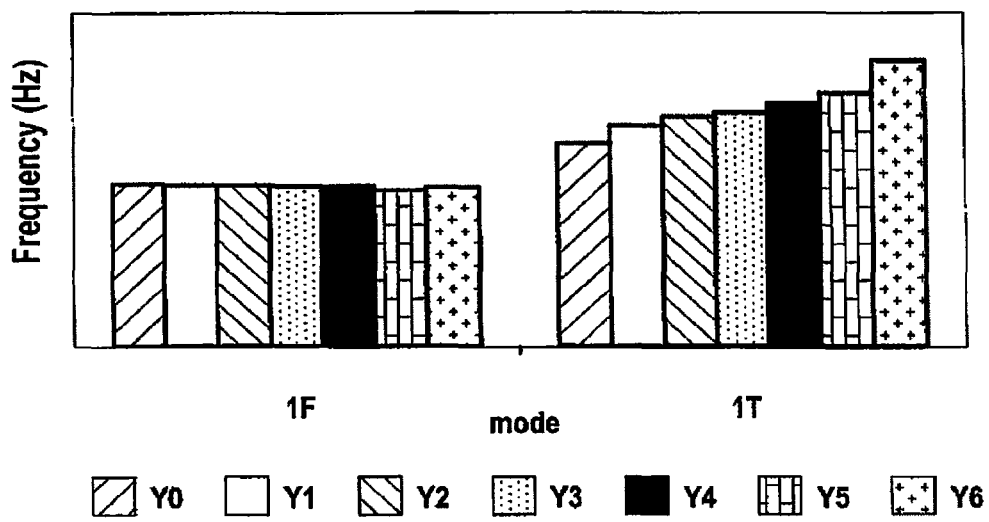

FIG. 6 shows the impact of the method on the resonant frequencies of the modes 1F and 1T of the blade.

This figure shows the modes 1F (first bending mode of the blade) and 1T (first twisting mode of the blade) that result from the altered twisting relationships represented by curves Y1 to Y6 in FIG. 5 (the modes 1F and 1T are also shown for the curve Y0 corresponding to the initial twisting relationship of the blade).

It can thus be seen that the frequency of the mode 1F remains relatively stable regardless of the altered twisting relationship (the alteration method therefore does not change the frequency placement of this mode 1F). As for the frequency of the mode 1T, it increases for twisting relationships that are altered relative to the initial twisting relationship, which does indeed correspond to the looked-for effect.

In particular, it may be observed that the greater the twisting relationship is altered (in terms of alteration amplitude and alteration slope), the more the frequency of the mode 1T is increased. By applying an alteration of about 5° to the initial twisting relationship, it is thus possible to increase the frequency of the mode 1T by 40% without modifying the frequency placement of the mode 1F, with this applying for the various stabilized operating points of the turbine engine.

Figure 7:
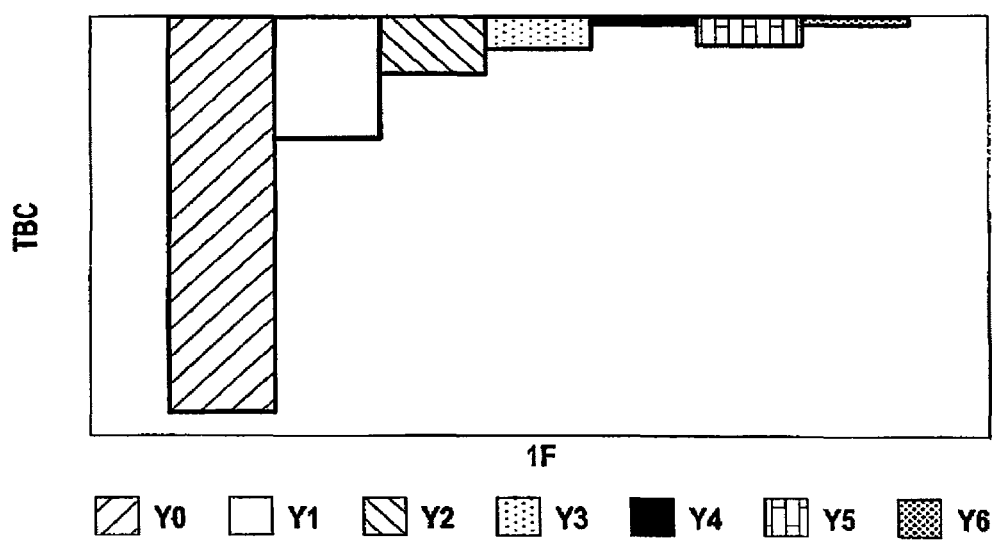

FIG. 7 shows the impact of the method on twist-bend coupling (TBC), which represents the contribution of twisting in the modal deformation of the mode 1F (the value of TBC is proportional to the shift in pure twisting over the shift in pure bending in the modal shift of the mode 1F at the tip of the blade).

In this figure, it can be seen that the twist-bend coupling is of smaller value with a blade that is stiff in twisting, which makes it possible to minimize any risk of asynchronous vibration of floating type.

Figure 8:
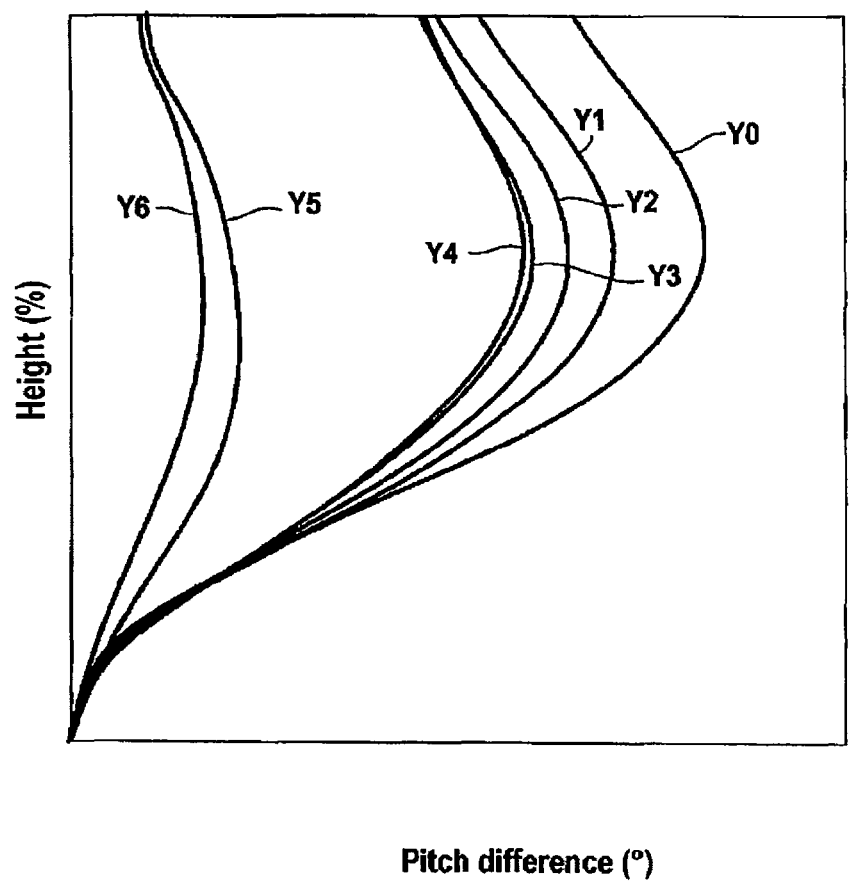

FIG. 8 shows the impact of the method on the untwisting of the blade (this figure plots variation in untwisting, i.e. pitch angle difference, for various sections of the blade as a function of their height).

In this figure, it can be seen that the fact of stiffening the blade in twisting (i.e. raising its mode 1T) provides a blade that is more robust. Specifically, the twisting relationship is modified when the blade is put into operation under the effect of centrifugal force and aerodynamic pressure, such that a blade that is more rigid in twisting gives untwisting that is more favorable in operation.

Once the alteration relationship has been applied to the twisting relationship of the fan blade, it is possible to proceed with altering sections of the blade in order to maintain its aerodynamic performance.

Typically, this alteration consists in locally modifying the fluid angles at the leading edges and at the trailing edges of the sections of the blade without modifying the twisting relationship. This step is performed iteratively and consists initially in measuring on the reference blade constructed with the twisting relationship prior to alteration the fluid angles at the leading edges and the trailing edges of the blade sections in the portion that is to be altered. Once the blade has been constructed on the basis of the altered twisting relationship, the blade sections are deformed so as to impose the fluid angles that were measured beforehand while conserving the necessary twisting alterations.

This step may require aerodynamic calculations to be iterated since deforming the blade sections can lead to alteration that differs from that defined on the reference blade constructed using the twisting relationship. In particular, since the difference between the camber line angle measured at the trailing edge varies as a function of this deformation, iterating deformation in the trailing zones of the modified blade sections makes it possible to guarantee a match between the reference blade and the blade constructed from the altered twisting relationship in terms of aerodynamic loading.

The invention claimed is:

1. A method of fabricating a fan blade of a gas turbine engine, the method comprising:
    establishing, for a portion of the aerodynamic surface of the fan blade, an alteration relationship defined by variation of a pitch angle of the blade as a function of radial height along the blade, said alteration relationship comprising alterations that are each defined by a height along with the radial height of the fan blade and by a twisting amplitude;
    applying the alteration relationship as previously established to an initial twisting relationship of the blade so as to obtain an altered twisting relationship for the fan blade, said initial twisting relationship being defined by a polynomial for the radial height of the fan blade as a function of a pitch angle of the fan blade;
    locally modifying fluid angles at a leading edge and a trailing edge of the fan blade comprising the altered twisting relationship previously obtained without modifying the altered twisting relationship by iteratively measuring on a reference blade constructed with the initial twisting relationship the fluid angles at the leading edge and the trailing edge of blade sections in the portion of the aerodynamic surface of the fan blade and, after applying the altered twisting relationship, deforming the blade sections to impose the fluid angles that were measured while conserving the altered twisting relationship and performing aerodynamic calculations in trailing zones of the blade sections in the portion of the aerodynamic surface of the fan blade; and
    fabricating the fan blade comprising the altered twisting relationship previously obtained and the locally modified fluid angles,
    wherein the alteration relationship is applied to a predetermined portion of the aerodynamic surface of the fan blade that extends from the root of the blade to a height corresponding to 30% of the total radial height of the blade and is defined as a mathematical function in such a manner as to be zero and to have a derivative of zero at at least one end of said predetermined portion, and
    wherein a number of alterations and the height and the twisting amplitude of each alteration are selected so as to comply with minimum frequency distances between a first twisting mode IT and fan blade harmonics nearest to the first twisting mode IT for various different stabilized operating points of the gas turbine engine, a frequency of the first twisting mode IT increasing as an alteration amplitude and an alteration slope of the alteration relationship increases without modifying a frequency of a first bending mode IF of the fan blade.

2. The method according to claim 1, wherein the alteration relationship is also defined in such a manner that the twisting amplitude of each alteration is of absolute value that is less than or equal to 5°.

3. The method according to claim 1, wherein the alteration relationship is also defined as a mathematical function in such a manner as to present a maximum slope of the order of 0.05°/mm.

4. The method according to claim 1, wherein the alteration relationship is a function for which the number of alterations corresponds to a number of local minimums and maximums of said function.

5. The method according to claim 1, wherein the alteration relationship comprises at least two alterations in opposite directions.

6. The method according to claim 1, wherein the step of applying the alteration relationship to the initial twisting relationship of the fan blade consists in adding the alteration relationship to the initial twisting relationship.

* * * * *